United States Patent [19]

Leung et al.

[11] Patent Number: 5,322,555
[45] Date of Patent: Jun. 21, 1994

[54] FIRE RESISTANT COATING COMPOSITION

[75] Inventors: Roger Y. Leung, Schaumburg, Ill.; John G. Sikonia, Long Valley, N.J.; Stephen T. Gonczy, Mt. Prospect, Ill.

[73] Assignee: Allied-Signal Inc., Morris Township, Morris County, N.J.

[21] Appl. No.: 84,397

[22] Filed: Jun. 29, 1993

Related U.S. Application Data

[60] Division of Ser. No. 863,481, Apr. 2, 1992, Pat. No. 5,266,533, which is a continuation of Ser. No. 684,425, Apr. 12, 1991, abandoned.

[51] Int. Cl.$^5$ .............................................. C09D 5/18
[52] U.S. Cl. ................................. 106/18.12; 528/31; 528/33; 528/40
[58] Field of Search ............... 106/18.12; 528/31, 33, 528/40

[56] References Cited

U.S. PATENT DOCUMENTS

| | | | |
|---|---|---|---|
| Re. 32,107 | 4/1986 | January | 501/12 |
| 4,578,116 | 3/1986 | Rott et al. | 106/18.12 |
| 4,661,577 | 4/1987 | Jolane et al. | 106/18.12 |
| 4,719,276 | 1/1988 | Stebleton | 106/18.12 |
| 4,727,127 | 2/1988 | Suzuki | 106/18.12 |
| 4,766,191 | 8/1988 | Gvozdic et al. | 106/18.12 |
| 4,981,820 | 1/1991 | Renlund | 501/39 |
| 5,006,142 | 4/1991 | Weidner | 65/32.5 |
| 5,043,002 | 8/1991 | Dobbins et al. | 65/3.12 |
| 5,128,494 | 7/1992 | Blum | 556/457 |
| 5,180,694 | 1/1993 | Renlund et al. | 501/12 |
| 5,231,059 | 8/1993 | Leung et al. | 501/12 |
| 5,242,866 | 9/1993 | Leung et al. | 501/12 |

FOREIGN PATENT DOCUMENTS

| | | |
|---|---|---|
| 2647777 | 12/1990 | France . |
| 90/110596 | 10/1990 | World Int. Prop. O. . |
| 90/12835 | 11/1990 | World Int. Prop. O. . |

OTHER PUBLICATIONS

Ceramic Engineering and Science Proceedings, vol. 12, No. 7/8, Aug., 1991 F. I. Hurwitz et al. "Polymeric Routes to Silicon Carbide and Silicon Oxycarbide CMC", pp. 1292–1303.

*Primary Examiner*—Anthony Green
*Attorney, Agent, or Firm*—Harold N. Wells; Gerhard H. Fuchs; Mary Jo Boldingh

[57] ABSTRACT

A black glass having the empirical formula $SiC_xO_y$ where x is greater than zero and up to about 2.0 and y is greater than zero and up to about 2.2 is produced from a cyclosiloxane polymer precursor by pyrolysis in the presence of oxygen by heating at a rate exceeding about 5° C./min.

1 Claim, No Drawings

FIRE RESISTANT COATING COMPOSITION

This application is a division of application Ser. No. 07/863,481, filed Apr. 2, 1992, U.S. Pat. No. 5,266,533 which is a continuation of U.S. Ser. No. 07/684,425 filed Apr. 12, 1991, now abandoned.

PRIOR ART

The invention relates generally to carbon-containing glass which may be used alone or as a matrix material reinforced with fibers.

In U.S. Ser. No. 002,049 a ceramic composition designated "black glass" is disclosed which has an empirical formula $SiC_xO_y$ where x ranges from 0.5 to about 2.0 and y ranges from about 0.5 to about 3.0, preferably x ranges from 0.9 to 1.6 and y ranges from 0.7–1.8. That ceramic material has a higher carbon content than prior art materials and is very resistant to high temperatures—up to about 1400° C. It is produced by reacting in the presence of a hydrosilylation catalyst a cyclosiloxane having a vinyl group with a cyclosiloxane having a hydrogen group to form a polymer precursor, which is subsequently pyrolyzed in an inert atmosphere to yield black glass. The present invention involves a new method of pyrolyzing such black glass precursors.

In co-pending application U.S. Ser. No. 07/586,632, it is shown that by including oxygen during the pyrolysis that the carbon content of the black glass can be adjusted to a lower value useful for certain purposes. We have now found that if the pyrolysis step is carried out rapidly enough that the effect of oxygen can be overcome and black glass having a high carbon content can be achieved, even if pyrolyzed in the presence of air.

SUMMARY OF THE INVENTION

A carbon-containing black glass ceramic composition having the empirical formula $SiC_xO_y$ where x is greater than zero and up to about 2.0, preferably up to about 1.6, and y is greater than zero and up to about 2.2, preferably up to about 1.8, is produced by pyrolyzing certain polymer precursors at a rate exceeding 5° C./min, preferably 50° C./min to 1000° C./min, most preferably above 100° C./min in the presence of oxygen, preferably in air.

The black glass ceramic composition is the pyrolyzed reaction product of a polymer prepared from (1) a cyclosiloxane monomer having the formula

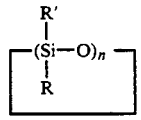

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said polymerization reaction taking place in the presence of an effective amount of hydrosilylation catalyst. The polymer product is pyrolyzed by heating in an oxidizing atmosphere at a rate above 5° C./min to a temperature in the range of about 800° C. to about 1400° C. The black glass ceramic thus produced retains carbon despite being in an oxidizing atmosphere. When the heating rate is above about 100° C./min, the black glass ceramic contains substantially the same amount of carbon as produced by pyrolysis in an inert atmosphere.

The black glass may be employed in many forms such as fibers, coatings, films, powders, monoliths, and particularly as a matrix for fiber reinforced composites.

The heating may be carried out using hot combustion gases, radiant energy, or other methods familiar to those skilled in the art. The carbon content may be controlled by adjusting the heating rate, and the oxygen access to the polymer during pyrolysis.

DESCRIPTION OF THE PREFERRED EMBODIMENTS

Black Glass Ceramic

The black glass ceramic has an empirical formula $SiC_xO_y$ wherein x is greater than zero and up to about 2.0, preferably up to about 1.6, and y is greater than zero and up to about 2.2, preferably up to about 1.8, whereby the carbon content ranges up to about 40% by weight. The black glass ceramic is the product of the pyrolysis at a rate exceeding 5° C./min in an oxidizing atmosphere to temperatures between about 800° C. and about 1400° C. of a polymer made from certain siloxane monomers. Preferably, a heating rate of 50° C./min to 1000° C./min is used, most preferably greater than 100° C./min. The carbon content will be determined generally by the heating rate and the access of oxygen to the polymer precursor during pyrolysis.

The polymer precursor of the black glass ceramic may be prepared by subjecting a mixture containing cyclosiloxanes of from 3 to 30 silicon atoms to a temperature in the range of from about 10° C. to about 300° C. in the presence of 1–200 wt. ppm of a platinum hydrosilylation catalyst for a time in the range of from about 1 minute to about 600 minutes. The polymer formation takes advantage of the fact that a silicon-hydride will react with a silicon-vinyl group to form a silicon-carbon-carbon-silicon bonded chain, thereby forming a network polymer. For this reason, each cyclosiloxane monomer must contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

The polymer precursor for the black glass ceramic may be defined generally as the reaction product of (1) a cyclosiloxane monomer having the formula

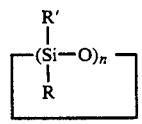

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from about 2 to 20 carbon atoms in which one vinyl carbon is directly bonded to silicon and R' is an alkyl group of from 1 to 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of hydrosilylation catalyst.

The black glass ceramic may be prepared from a cyclosiloxane polymer precursor wherein both the requisite silicon-hydride bond and the silicon-vinyl bond are present in one molecule, for example, 1,3,5,7-tetravinyl-1,3,5,7-tetrahydro-cyclotetrasiloxane. Such monomers may also contain alkyl groups such as, for example, 1,3-divinyl-1,5-dihydro-3,5,7,7-tetramethylcyclosiloxane- Alternatively, two or more cyclosiloxane monomers may be polymerized. Such monomers would contain at least either a silicon hydride bond or a silicon-vinyl bond and the ratio of the two types of bonds should be about 1:1, more broadly about 1:9 to 9:1.

Examples of such cyclosiloxanes include, but are not limited to:

1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3-divinyl-1,5-dihydro-3,5,7,7-tetramethylcyclosiloxane
1,3,5-trivinyl-1,3,5,7,7-pentamethylcyclotetrasiloxane
1,3,5-trihydro-1,3,5,7,7-pentamethylcyclotetrasiloxane
1,3,5,7,9,11,13,15,17,19,21,23,25,27,29-pentadecavinyl-1,3,5,7,9,11,13,15,17,19,21,23,25,27,29-pentadecahydrocyclopentadecasiloxane
1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.

It will be understood by those skilled in the art that while the siloxane monomers may be pure species, it will be frequently desirable to use mixtures of such monomers, in which a single species is predominant. Mixtures in which the tetramers predominate have been found particularly useful.

While the reaction works best if platinum is the hydrosilylation catalyst, other catalysts such as cobalt and manganese carbonyl will perform adequately. The catalyst can be dispersed as a solid or can be used as a solution when added to the cyclosiloxane monomer. With platinum, about 1 to 200 wt. ppm, preferably 1 to 30 wt. ppm as the metal will be employed as the catalyst.

Black glass precursor polymer may be prepared from either bulk or solution polymerization. In bulk polymerization, neat monomer liquid, i.e., without solvents, reacts to form oligomers or high molecular weight polymers. In bulk polymerization, a solid gel can be formed without entrapping solvent. It is particularly useful for impregnating porous composites to increase density. Solution polymerization refers to polymerizing monomers in the presence of an unreactive solvent.

When the resin is used in impregnating fibers to form prepreg, it preferably is prepared by solution polymerization. The advantage of solution polymerization is the ease of controlling resin characteristics. It is possible but very difficult to produce B-stage resin suitable for prepregs with consistent characteristics by bulk polymerization. Soluble resin with the desirable viscosity, tackiness, and flowability suitable for prepregging and laminating can be obtained consistently using solution polymerization process. The production of easily handleable and consistent resin is very critical in composite fabrication.

FIBERS

Where reinforcing fibers are used with the black glass ceramic they typically are refractory fibers which are of interest for applications where superior physical properties are needed. They include such materials as boron, silicon carbide, graphite, silica, quartz, S-glass, E-glass, alumina, aluminosilicates, boron nitride, silicon nitride, boron carbide, titanium boride, titanium carbide, zirconium oxide, silicon carbonitride, silicon oxycarbonitride and zirconia-toughened alumina. The fibers may have various sizes and forms. They may be monofilaments from 1 $\mu$m to 200 $\mu$m diameter or tows of 200 to 2000 filaments. When used in composites of the invention they may be woven into fabrics, pressed into mats, or unidirectionally aligned with the fibers oriented as desired to obtain the needed physical properties.

An important factor in the performance of the black glass composites is the strength of the bond between the fibers and the black glass matrix. Consequently, where improved mechanical strength or toughness is desired, the fibers are provided with a coating which reduces the bonding between the fibers and the black glass matrix. The surface sizings found on fibers as received or produced may be removed by solvent washing or heat treatment and the coating applied, which may be of carbon or other materials such as boron nitride and silicon carbide.

Various methods may be used to apply a carbon coating, including chemical vapor deposition, solution coating, and pyrolysis of organic polymers such as carbon pitch and phenolics. One preferred technique is chemical vapor deposition using decomposition of methane or other hydrocarbons. Another method is pyrolysis of an organic polymer coating such as phenol-formaldehyde polymers cross-linked with such agents as the monohydrate or sodium salt of paratoluenesulfonic acid. Still another method uses toluene-soluble and toluene-insoluble carbon pitch to coat the fibers. Boron nitride and silicon carbide coatings are typically applied by chemical vapor deposition from a gaseous precursor.

PROCESSING

As previously discussed, the black glass precursor is a polymer. It may be shaped into fibers and combined with reinforcing fibers or the black glass precursor may be used in solution for coating or impregnating reinforcing fibers. Various methods will suggest themselves to those skilled in the art for combining the black glass precursor with reinforcing fibers. It would, for example, be feasible to combine fibers of the polymer with fibers of the reinforcing material and then to coat the resulting fabric or mat. Alternatively, the reinforcing fibers could be coated with a solution of the polymer and then formed into the desired shape. Coating may be done by dipping, spraying, brushing, or the like.

In one method, a continuous fiber is coated with a solution of the black glass precursor polymer and then wound on a rotating drum covered with a release film which is easily separated from the coated fibers. After sufficient fiber has been built up on the drum, the process is stopped and the unidirectional fiber mat removed from the drum and dried. The resulting mat (i.e., "prepreg") then may be cut and laminated into the desired shapes.

In a second method, a woven or pressed fabric of the reinforcing fibers is coated with a solution of the black glass precursor polymer and then dried to remove the solvent, after which it may be formed into the desired shapes by procedures which are familiar to those skilled in the art of fabricating structures with the prepreg sheets. For example, layers of prepreg sheets may be laid together and pressed into the needed shape. The orientation of the fibers may be chosen to strengthen the composite part in the principal load-bearing directions.

A third method for fabricating the polymer composite is by resin transfer molding. In resin transfer molding a mold with the required shape is filled with the desired reinforcement material. The reinforcement could be a preform having a 3-dimensional weave of fibers, a lay-up of fabric plies, a non-woven mat of chopped staple or bundled tows, or assemblies of whiskers, and such others as are familiar to those skilled in the art. The reinforcement material would be coated with carbon, boron nitride or other appropriate material to insure a weak bond between matrix and reinforcement in the final composite where improved mechanical strength or toughness is desired. These coatings may be omitted where the end use does not require high tensile strength. The filled mold is injected, preferably under vacuum, with the neat monomer solution with an appropriate amount of catalyst. The relative amounts of vinyl- and hydro-monomers will be adjusted to obtain the desired carbon level in the pyrolyzed matrix. The low viscosity (<50 centipoise) of the neat monomer solution is exceptionally well suited for resin impregnation of thick wall and complex shape components.

The filled mold is then heated to about 30° C.–150° C. for about ½–30 hours as required to cure the monomer solutions to a fully polymerized state. The specific cure cycle is tailored for the geometry and desired state of cure. For example, thicker wall sections require slower cures to prevent uneven curing and exothermic heat build-up. The cure cycle is tailored through control of the amount of catalyst added and the time-temperature cycle. External pressure may be used during the heating cycle as desired.

When the component is fully cured, it is removed from the mold. In this condition it is equivalent in state to the composite made by lamination and autoclaving of prepreg plies. Further processing consists of the equivalent pyrolysis and impregnation cycles to be described for the laminated components.

Solvents for the black glass precursor polymers include hydrocarbons, such as isooctane, toluene, benzene, and xylene, and ethers, such as tetrahydrofuran, and ketones, etc. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, or alkoxysilane, the precursor polymer is not water sensitive. No particular precaution is needed to exclude water from the solvent or to control relative humidity during processing.

The resin ages very slowly when stored at or below room temperatures as is evident from its shelf life of more than three months at these temperatures. The resin is stable both in the solution or in the prepreg. Prepregs stored in a refrigerator for three months have been used to make laminates without any difficulty. Also, resin solutions stored for months have been used for making prepregs successfully.

Large and complex shape composites can be fabricated from laminating prepregs. One method is hand lay-up. Several plies of prepregs cut to the desired shape are laid-up to achieve the required thickness of the component. Fiber orientation can be tailored to give maximum strength in the preferred direction. Fibers can be oriented unidirectionally [0], at 90° angles [0/90], at 45° angles [0/45 or 45/90], and in other combinations as desired. The laid-up plies are then bonded by vacuum compaction before autoclave curing. Another fabrication method is tape laying which uses pre-impregnated ribbons in forming composites. The resin properties can be controlled to provide the desired tackiness and viscosity in the prepreg for the lay-up procedures.

After the initial bonding of the prepreg plies, the composites are further consolidated and cured by heating to temperatures up to about 250° C. under pressure. In one method, the composited prepreg is placed in a bag, which is then evacuated and the outside of the bag placed under a pressure sufficient to bond the layered prepreg, say up to about 1482 kPa. The resin can flow into and fill up any voids between the fibers, forming a void-free green laminate. The resulting polymer-fiber composite is dense and is ready for conversion of the polymer to black glass ceramic.

Heating the composite to temperatures from about 800° C. up to about 1400° C. (pyrolysis) converts the polymer into a black glass ceramic containing essentially only carbon, silicon, and oxygen. According to this invention, the carbon content may be varied by adjusting the heating rate and the access of oxygen to the polymer precursor during pyrolysis. It is characteristic of the black glass prepared by pyrolyzing the cyclosiloxanes described above that the resulting black glass may have a large carbon content, but it is able to withstand exposure to temperatures up to about 1400° C. in air without oxidizing to a significant degree. Pyrolysis is usually carried out with a heating to the maximum temperature selected, holding at that temperature for a period of time determined by the size of the structure, and then cooling to room temperature. When fabricated using appropriate fiber type, volume, and architecture, little bulk shrinkage is observed for the black glass composites and the resulting structure typically has about 70–80% of its theoretical density. Conversion of the polymer to black glass takes place between 430° C. and 950° C.

Since the pyrolyzed composite structure still retains voids, the structure may be increased in density by impregnating with a neat monomer liquid or solution of the black glass precursor polymer. The solution is then gelled by heating to about 50° C.–120° C. for a sufficient period of time. Following gelation, the polymer is pyrolyzed as described above. Repeating these steps, it is feasible to increase the density up to about 95% of the theoretical.

PYROLYSIS

Heretofore, as discussed in co-pending U.S. patent application Ser. No. 07/586,632, we have believed that including oxygen in the atmosphere during pyrolysis would burn off at least some and up to all of the carbon, leaving in the extreme case essentially only silica, $SiO_2$. A feature of the black glass ceramic has been that once formed the carbon appears to be unreactive when later exposed to oxygen. When a reduced carbon content was desired, as in co-pending application, U.S. Ser. No. 07/586,632, oxygen could be introduced during pyrolysis. In a series of experiments the composition of the pyrolyzed product was varied depending upon the amount of oxygen present in the atmosphere as shown in the following table. The heating rate was 2° C./min up to 850° C.

| | Product Composition | |
|---|---|---|
| $O_2$ % | Carbon, Wt. % | Formula |
| 0 | 27 | $SiC_{1.37}O_{1.03}$ |
| 2 | 22 | $SiC_{1.15}O_{1.09}$ |
| 5 | 17 | $SiC_{0.91}O_{1.55}$ |
| 10 | 13 | $SiC_{0.71}O_{1.69}$ |
| 20 | 0.7 | $SiC_{0.36}O_{2.10}$ |

One might conclude, as we previously believed, that oxygen should be excluded during pyrolysis if a high carbon content was wanted. This has now been discovered to be only one method of achieving a high carbon content and that, in fact, air can be present, provided that the heating proceeds at a rate exceeding about 50° C./min, at which condition the thermal decomposition of the polymer precursors dominates the oxidation reaction which would remove carbon.

There are believed to be two reactions which the precursor polymers undergo during pyrolysis, namely a decomposition:

(1) Precursor→$SiC_xO_y$+$CH_4$+$H_2$+other hydrocarbons and an oxidation:

(2) Precursor+$O_2$→$SiO_2$+$H_2O$+$CO_2$+$CO$+$H_2$+ other hydrocarbons.

It appears that when the precursors are heated rapidly enough reaction (1) is favored and reaction (2) is slowed by the need to diffuse oxygen to the polymer. Consequently, under proper conditions in the presence of oxygen, the precursor polymers can be converted to black glass having a high carbon content. It would follow that one could produce a black glass having the maximum carbon content, equivalent to pyrolysis in an inert atmosphere, by heating the black glass precursors rapidly so that reaction (1) is favored, or one could adjust the carbon content by using a less rapid heating rate and/or adjusting the oxygen access to the precursor polymer so that some carbon would be lost by reaction (2). We prefer, for convenience and economy, to heat the black glass precursors as rapidly as possible, i.e., above 50° C./min, in air, preferably above about 100° C./min up to 1000° C./min. The heating rate for achieving maximum carbon content in the black glass ceramic should exceed about 100° C./min, whereupon it is possible to obtain a black glass ceramic having about 27 wt. % carbon.

The amount of carbon in the final black glass produced by rapid pyrolysis also depends on access of oxygen to the precursor polymers via the gas flow rate and on sample size and geometry. It will be understood by those skilled in the art that the desired carbon content can be obtained, for example, by adjusting (1) heating rate, (2) oxygen content of the atmosphere, (3) gas flow rate, (4) sample size, and (5) sample surroundings (e.g., covering the sample to limit the access of oxygen).

Once it is recognized that rapid pyrolysis can produce black glass even in the presence of oxygen, then the procedure can be carried out in various ways, including direct application of hot combustion gases, or exposure to radiant energy. Other examples would include laser heating, RF induction heating, plasma heating, liquid and fluidized bed immersion, microwave heating, convective gas heating, direct resistance heating and the like.

Direct exposure to flames would be expected to produce a black glass containing high levels of carbon, since the heating would be rapid and oxygen should be present. For general use such a method might be too uncontrolled to provide uniform results. However, it might be useful for pyrolysis of small areas in a larger piece of black glass material. Alternatively, since the polymer precursors convert to a black glass ceramic, which is resistant to further oxidation they could be used as fire resistant coatings, taking advantage of the rapid pyrolysis of the invention.

EXAMPLE 1

Polymer Precursor Preparation

The cyclosiloxane having silicon-vinyl bond was poly(vinylmethylcyclosiloxane) (ViSi). The cyclosiloxane with a silicon-hydride bond was poly(methylhydrocyclosiloxane) (HSi). Both cyclosiloxanes were mixtures of monomers, about 85% by weight being the cyclotetramer with the remainder being principally the cyclopentamer and cyclohexamer. A volume ratio of 59 ViSi/41 HSi was mixed with 22 wt. ppm of platinum as a platinum-cyclovinylmethylsiloxane complex. 200 mL of the monomer solution was heated at 50° C. for 6 hours and then gelled and post-cured at 100° C. for 2 hours. The resin produced was poly(methyl methylenecyclosiloxane) (PMMCS). It was hard and dry at room temperature.

EXAMPLE 2

Samples of about 80 mg of black glass precursors prepared as in Example 1 having a particle size of 1–2 mm were placed in a thermogravimetric analysis instrument (TGA) (Mettler). Air at the rate of 200 mL/minute was passed over the samples and the temperature was raised at a rate of 100° C./min, 50° C./min, 25° C./min, 10° C./min, and 1° C./min to a temperature of 900° C. and then held there for 30 minutes. The results are shown in the following table.

| Heating Rate | PRODUCT | | | |
|---|---|---|---|---|
| | Color | Yield, % | Appearance | Carbon, wt. % |
| 1° C./min | Off White | 80 | Powdery | <1 |
| 10° C./min | Gray | 82.3 | Glassy | <2 |
| 25° C./min | Gray | 85 | Glassy | 6 |
| 50° C./min | Black | 86 | Glassy | 17 |
| 100° C./min | Black | 86 | Glassy | 24 |

It will be seen that the carbon content increased as the heating rate was increased and that black glass equivalent in carbon content to black glass produced by heating in an inert atmosphere resulted from the highest heating rate. For heating rates below 100° C./min, the TGA results showed that all of the weight loss occurred during the heating period. There was no additional weight loss in the 900° C. holding period, indicating that the product was stable.

EXAMPLE 3

Two samples were rapidly heated by placing them in a preheated furnace at 860° C. in stagnant air. One sample was a strip of PMMCS resin about 1 mm thick by 2.5 cm × 3.5 cm. The second sample was a 6 cm × 0.5 cm composite 2 mm thick in which Nextel ® 480 fibers reinforced a PMMCS matrix. The Nextel ® 480 composite was fabricated by autoclave curing stacks of B-stage resin impregnated prepregs. Both samples were placed on alumina foam blocks, introduced into the 860° C. preheated furnace, and left for 1 hour and 40 minutes. After removing the samples and cooling them freely in the air to room temperature measurements were made to determine the nature of the products, as given in the following table.

| Sample | Weight, gms | | Yield, % | Appearance | Analysis |
|---|---|---|---|---|---|
| | Initial | Final | | | |
| Resin | 0.8507 | 0.7190 | 84.5 | Black, glassy | $SiC_{1.47}O_{1.17}$ |
| Composite | 0.9862 | 0.8930 | 90.6 | Black | — |

Again it can be seen that rapid heating, even in air, can yield a black glass having a high carbon content. It is estimated that the rate of heating in this experiment was about 300°–1000° C./min.

EXAMPLE 4

A piece of PMMCS resin prepared as in Example 1 (1 mm × 2.5 cm × 3.5 cm) was placed in an oven preheated to 866° C., left there for 18 hours in stagnant air, and then cooled to room temperature over 5 hours. The heating rate was estimated to be about 300°–1000° C./min. The product had a black color. Elemental analysis of the pyrolyzed material by Leco carbon analysis and atomic absorption of silicon showed that the product contained 24.3 wt. % carbon and 45.6 wt. % silicon.

EXAMPLE 5

(Comparative)

A piece of PMMCS resin prepared as in Example 1 (1 mm × 2.5 cm × 3.5 cm) was heated in stagnant air from room temperature to 850° C. over 8 hours and then held at 850° C. for 1 hour before cooling to room temperature over 8 hours. The heating rate was about 1.7° C./min. The product was white and the yield was 80%. A carbon analysis by Leco carbon analyzer showed the product contained only 0.7 wt. % carbon.

The results of Example 5 indicate that the rate of heating dramatically affects the carbon content when compared with the results of Example 4.

We claim:

1. A fire resistant coating composition comprising the reaction product of (1) a cyclosiloxane monomer having the formula

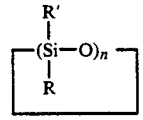

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from 2 to 20 carbon atoms in which one vinyl carbon is directly bonded to silicon and R' is an alkyl group of from 1 to 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of a catalytically effective amount of hydrosilylation catalyst.

* * * * *